United States Patent [19]

Cheng

[11] 4,299,797
[45] Nov. 10, 1981

[54] CARBON BLACK PRODUCTION

[75] Inventor: Paul J. Cheng, Bartlesville, Okla.

[73] Assignee: Phillips Petroleum Company, Bartlesville, Okla.

[21] Appl. No.: 170,423

[22] Filed: Jul. 21, 1980

Related U.S. Application Data

[62] Division of Ser. No. 834,200, Sep. 19, 1977, Pat. No. 4,225,570.

[51] Int. Cl.³ .................. C01B 31/02; C09L 1/48
[52] U.S. Cl. .................................. 422/112; 422/156; 422/151; 423/450; 423/455
[58] Field of Search ............... 422/150–158, 422/456, 457

[56] References Cited

U.S. PATENT DOCUMENTS

| | | | |
|---|---|---|---|
| 2,599,981 | 6/1952 | Ekholm | 422/151 |
| 2,769,692 | 11/1956 | Heller | 423/457 |
| 2,782,101 | 2/1957 | Heller | 423/457 |
| 2,967,762 | 1/1961 | Krejci | 422/156 |
| 3,057,695 | 10/1962 | Osburn, Jr. | 422/112 |
| 3,165,522 | 1/1965 | Dye | 422/112 |
| 3,467,502 | 9/1969 | Davis | 422/112 |
| 4,134,966 | 1/1979 | Austin | 422/158 X |

Primary Examiner—Michael S. Marcus

[57] ABSTRACT

Carbon black is produced in a reactor by introducing a carbonaceous feed material into one end of the reactor. One or more streams of hot gases are introduced in a direction generally tangential to the side wall of the precombustion zone of the reactor and in a plane generally perpendicular to the longitudinal axis of the reactor to supply heat to decompose the feed material to produce carbon black. This operation is continued until the pressure drop across the reactor reaches a preselected higher value. Thereafter, the stream or streams of hot gases are introduced tangentially to the side wall of the precombustion zone but with each stream being in a respective plane at an angle less than 90° to the longitudinal axis of the reactor and in a downstream direction with respect to the longitudinal axis of the reactor so as to reduce the pressure drop to a lower value.

5 Claims, 4 Drawing Figures

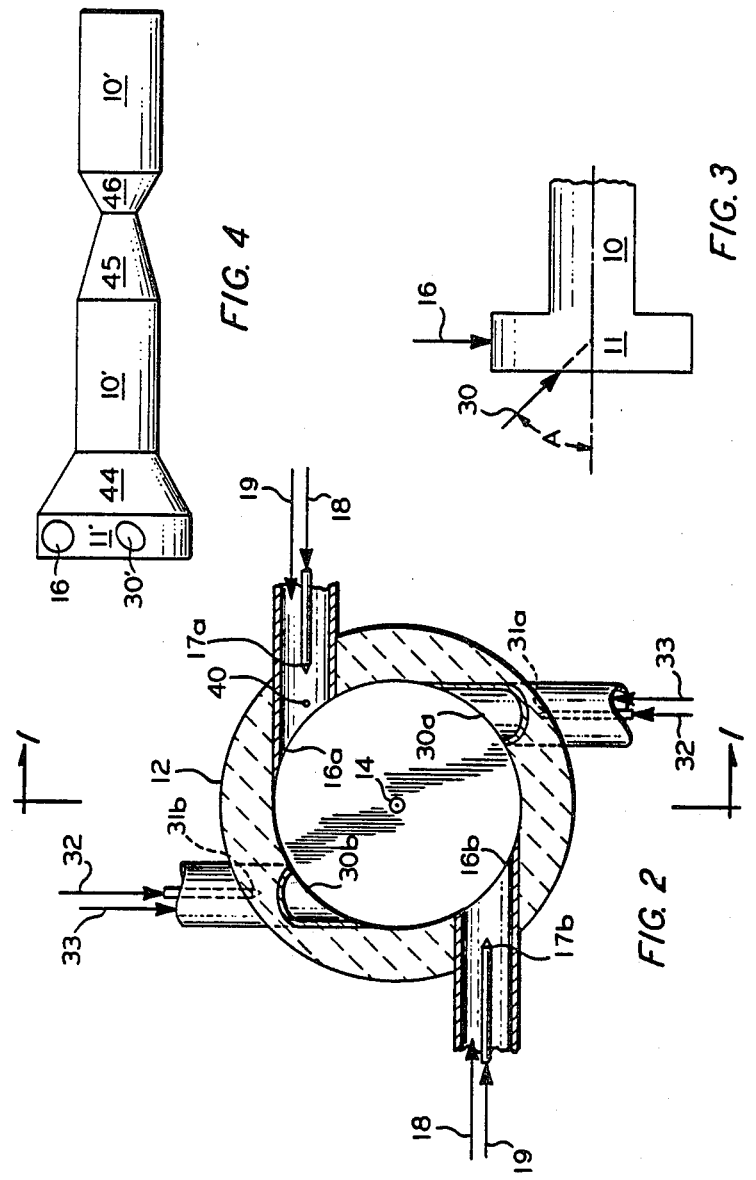

CARBON BLACK PRODUCTION

This application is a division of our copending application Ser. No. 834,200, filed Sept. 19, 1977, now U.S. Pat. No. 4,225,570.

The present invention relates to a carbon black reactor which is provided with means for reducing pressure drop. The means includes combustion gas inlets which are disposed in a direction to selectively introduce combustion gases into the reactor in a plane at an angle of less than 90° to the longitudinal axis of the reactor.

Substantial quantities of carbon black are produced by the so-called furnace processes in which a carbonaceous feed material, such as an aromatic oil, is heated in a reactor to a temperature sufficiently high to decompose the feed material to produce carbon black. The carbon black reactors employed in such processes are usually of circular transverse cross section, with the feed being introduced near one end of the reactor in a direction along the longitudinal axis. The heat to decompose the oil is supplied by introducing hot gases, such as combustion gases, into the reactor to surround the feed material. It is common practice to introduce the hot gases in a direction generally tangential to the side wall of the reactor and in a direction which is in a plane generally perpendicular to the longitudinal axis of the reactor. This method of operation provides stable combustion and generates sufficient heat to decompose the feed material to produce a carbon black containing effluent.

In many commercial reactors of the type described, one factor which limits production is the capacity of the air compressor which supplies air to burn fuel to form the hot combustion gases. Because of this limiting factor, the pressure drop across the reactor should be maintained at a minimum in order to realize maximum production. However, there is a limit to the pressure drop reduction because the tint value (Tinting Strength, ASTM D-3265-75) of the produced carbon black is a function of pressure drop across the reactor. If this pressure drop is decreased, the tint of the black tends to decrease, which is not desired in certain cases. Unfortunately, the pressure drop in a reactor normally tends to increase as a function of length of time of operation of the reactor. This effect is due to deposits being formed within the reactor and erosion of the refractory lining which roughens the surface. An increase in pressure drop, with the air compressor capacity being limiting, decreases the air flow rate, thereby requiring a decrease in feed oil to be charged, in order to maintain the constant air-to-oil ratio needed to make the same particle size carbon black. This reduced feed oil requirement decreases the pounds of carbon black made per hour.

In accordance with this invention, a method and apparatus are provided for producing maximum quantities of carbon black having given properties before it is necessary to rebuild the refractory lining of the reactor. This is accomplished by operating the reactor initially with at least one stream of hot combustion gases being introduced tangentially to the side wall of the precombustion zone and in a direction in a plane generally perpendicular to the longitudinal axis of the reactor. When the measured pressure drop across the reactor increases to a preselected value, the direction of introduction of the stream of hot gases is changed. Each stream of hot gases is still introduced in a direction generally tangential to the side wall of the reactor, but in a direction toward the downstream end of the reactor such that the angle of the plane of introduction of the respective stream is substantially less than 90° with respect to the longitudinal axis of the reactor. The resulting change in the direction of introduction of each of the streams of hot gases tends to reduce the pressure drop within the reactor, thereby permitting maximum production of carbon black having desired properties to be obtained as a result of charging maximum air volume to the reactor at the original air-to-oil ratio.

FIG. 2 is a view taken along line 2—2 in FIG. 1.

FIG. 3 is a schematic view which illustrates the angles at which streams of hot gases are introduced into the reactor.

FIG. 4 is a schematic representation of a second embodiment of a reactor in which the method of this invention can be conducted.

Figure 1:
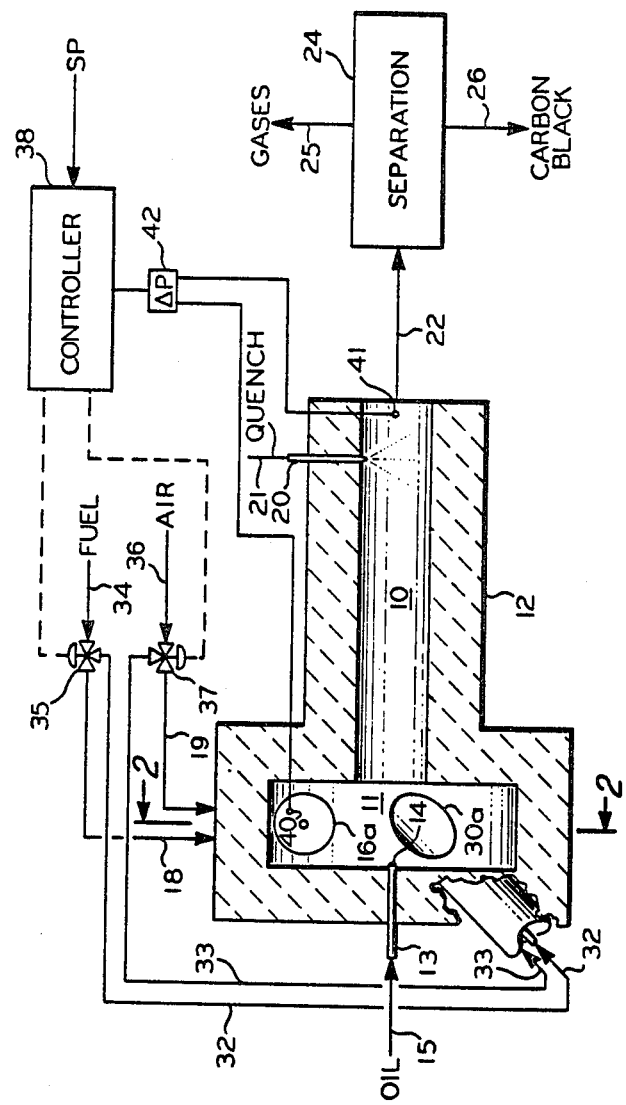
FIG. 1 is a schematic representation of an embodiment of an apparatus of this invention.

Referring now to the drawing in detail and to FIGS. 1 and 2 in particular, there is shown a carbon black reactor which comprises a cylindrical reaction section 10 and a cylindrical combustion or precombustion section 11 of larger diameter positioned upstream of section 10. Sections 10 and 11 are surrounded with a mass of refractory 12 which provides thermal insulation. This refractory is usually formed in several sections and is surrounded by a metal shell. However, only a single layer of refractory is illustrated in order to simplify the drawing. A carbonaceous feed material, such as an aromatic oil, is introduced through a tube 13 which has a nozzle 14 at the end thereof. Tube 13 and nozzle 14 serve to introduce the feed material generally along the longitudinal axis of the reactor, although the nozzle can actually spray the feed oil outwardly from the longitudinal axis. This feed oil material is introduced into the tube 13 by a conduit 15. In some operations, the tube 13 is provided with a jacket through which air can be introduced to cool the nozzle. Tubes 16a and 16b are in open communication with precombustion section 11 in directions generally tangential to the side wall of the precombustion section, as shown in FIG. 2. The longitudinal axes of tubes 16a and 16b lie in a plane which is generally normal to the longitudinal axis of the precombustion section 11. Preferably the tubes 16a and 16b are directed to introduce the combustion gases in a common rotational direction. Burner nozzles 17a and 17b are disposed within respective tubes 16a and 16b. A fuel, such as a combustible gas or oil, is introduced through a conduit 18 which communicates with each of burner nozzles 17a and 17b. Air is introduced through a conduit 19 which communicates with each of tubes 16a and 16b. This results in the formation of two streams of hot combustion gases which are introduced into section 11 to surround the feed material. A quench medium is introduced into the downstream region of the reactor section 10 through one or more inlets 20. A quench medium, such as water or cooled gases, is introduced through a conduit 21.

The reactor effluent, which comprises carbon black suspended in gases, is removed through a conduit 22 and directed to separation equipment 24. This equipment, which can include conventional filter bags and cyclones, separates the produced carbon black from the gases. The gases are withdrawn through a conduit 25, and the carbon black is withdrawn through a conduit 26.

The apparatus thus far described constitutes one embodiment of a conventional carbon black reactor. The details of such a reactor and methods of operation are disclosed in U.S. Pat. No. 2,564,700, for example, the disclosure of which is herein incorporated by reference.

In accordance with this invention, the reactor is provided with additional inlets for hot combustion gases. As illustrated in FIG. 2, additional tubes 30a and 30b enter section 11 in directions generally tangential to the side wall of the section. However, these tubes are pointed in a downstream direction in the reactor. This is illustrated schematically in FIG. 3 wherein the arrow 30 shows that the longitudinal axis of tube 30b lies in a plane which makes an angle A with the longitudinal axis of the reactor. Tubes 30a and 30b are provided with respective burner nozzles 31a and 31b. A conduit 32 introduces fuel into these burner nozzles, and a conduit 33 introduces air into tubes 30a and 30b. Preferably the tubes 30a and 30b are directed to introduce the combustion gases in a common rotational direction and are disposed about 180° apart.

As illustrated in FIG. 1, fuel conduits 18 and 32 communicate with a control valve 35, as does a fuel supply conduit 34. When valve 35 is in a first position, fuel from conduit 34 is passed through conduit 18 and there is no flow in conduit 32. When valve 35 is in a second position, fuel from conduit 34 passes to conduit 32 and there is no flow in conduit 18. Also, a portion of the combustion gases can be introduced via the tubes 30a and 30b simultaneously with a portion of the combustion gases being introduced via the tubes 16a and 16b. In a similar fashion, air conduits 19 and 33 are connected to a control valve 37, as is an air supply conduit 36. The valve 37 permits the alternate introduction of air into conduits 19 and 33. Valves 35 and 37 can be manipulated by a conventional controller 38. To this end, a first pressure sensing probe 40 is positioned within the reactor at a point adjacent the introduction of hot gases into the reactor. A second pressure measuring probe 41 is positioned at the downstream end of the reactor. These two probes are connected to a conventional differential pressure measuring device 42 which establishes a signal representative of the pressure drop across the precombustion zone and the reactor. The output signal from device 42 is connected to the input of controller 38. Controller 38 is also provided with an input setpoint signal which represents a predetermined pressure difference. As will be explained hereinafter in greater detail, fuel and air initially are supplied to the reactor by conduits 18 and 19. When the measured differential pressure reaches a predetermined value, controller 38 manipulates valves 35 and 37 to divert the fuel and air to respective conduits 32 and 33.

As is well known, there are many factors which affect the quality and quantity of carbon black produced in a given reactor. One of these factors is the air-to-oil ratio. If the air-to-oil ratio is increased, smaller particle size carbon black is produced. Conversely, a decrease in the air-to-oil ratio results in the production of larger particle size carbon black. Another factor which influences the properties of the carbon black is the pressure drop across the reactor. As the pressure drop decreases, the tint value of the produced carbon black decreases. Conversely, an increase in the pressure differential results in an increase in tint value. In accordance with this invention, a method is provided for producing a maximum amount of carbon black having preselected properties within a given reactor. As previously mentioned, the factor which limits the production in many commercial reactors is the capacity of the blower or compressor which supplies air to the tangential burners.

In accordance with this invention, the initial operation is conducted by employing the maximum amount of available tangential air. The oil rate is selected to give an air-to-oil ratio which produces a desired particle size carbon black. This value can readily be determined by routine tests to determine the oil rate which gives the desired particle size. At this time, valves 35 and 37 are positioned so that fuel and air are introduced through respective conduits 18 and 19. With the passage of time, deposits and/or rough surfaces may develop in the reactor to increase the pressure differential across the reactor. This differential pressure increase will result in an increase in the tint value of the produced black. Since the compressor or blower supplying the air is operating at maximum capacity, the actual air flow through the reactor tends to decrease. This normally requires that the oil rate be decreased in order to produce black having a desired particle size by maintaining the original air-to-oil ratio. However, such a decrease in oil rate results in a decrease in carbon black production. This is overcome in accordance with the present invention by manipulating valves 35 and 37 to divert fuel and air into conduits 32 and 33, respectively, when a preselected pressure differential is reached within the reactor. The resulting introduction of fuel and gas at angle A, see FIG. 3, tends to decrease the pressure drop through the reactor so that it is not necessary to decrease the oil rate introduction in order to continue producing black having desired particle size.

While an initial introduction of fuel and air through respective conduits 32 and 33 would have resulted in a lower pressure drop, the tint value of the produced black would have been too low because of the low differential pressure that would have resulted in the reactor. In order to avoid such a low pressure differential, more air would have been required than the blower or compressor is capable of supplying.

FIG. 4 is a schematic representation of another embodiment of a reactor in which the present invention can be conducted. The primed numbers indicate similar parts or structures as the corresponding unprimed numbers for the form shown in FIGS. 1-3, inclusive. This reactor includes a section 44 in the form of a truncated cone which is disposed between sections 11' and 10'. The total angle of convergence of section 44 is between about 0° and about 180°, preferably between about 20° and about 150° and more preferably between about 30° and about 120°. In addition, the reactor is provided with a venturi which is formed by a converging section 45 and a diverging section 46. Tubes 16' and 30' correspond to respective tubes 16a and 30a of FIG. 1. The use of a venturi promotes more thorough mixing in the reactor, but increases the pressure drop. The present invention is useful with either type of reactor.

The angle A, see FIG. 3, is generally of the order of about 30° to about 60°, with an angle of about 45° generally being preferred. While an angle of less than 30° will reduce the pressure drop across the reactor by even a greater amount, it is difficult to maintain stable combustion of the fuel introduced through conduit 32. As illustrated in FIG. 2, two sets of two tubes (16a, 16b and 30a, 30b) are provided to introduce combustion gases at each of the selected angles. This number of tubes at each angle can be one or more. However, the use of two tubes at each angle generally provides a good path.

Preferably, when two tubes at each angle are provided they are in generally opposed relation. The method of this invention as described above changes the angle at which the hot combustion gases are introduced when a predetermeined pressure differential is reached. If desired, more than one set of additional two tubes can be provided so that the angle A of the burner being employed is decreased in two or more steps progressively. However, there is a practical limit to the number of inlet tubes which can be provided.

In order to demonstrate the principle of operation of this invention, several runs were conducted on a laboratory size reactor having the configuration of FIG. 4. The reactor sections 10 and 10′ had a diameter of 3 inches (7.6 cm), and the venturi had a diameter of 1.6 inches (4.1 cm) at the junction of sections 45 and 46. Section 11′ was 8 inches (20.3 cm.) in diameter and 3 inches (7.6 cm.) in length. Section 44 had a total angle of convergence of 30°. Air at room temperature was introduced through a series of tangential inlets at the rate of about 12,000 SCF/hr. Additional runs were conducted in a reactor of the same configuration, but without the venturi. The resulting pressure drops across the reactor (corresponding to ΔP in FIG. 4) were as follows:

| | ΔP (inches of water) | |
|---|---|---|
| Angle (A) | With Venturi | Without Venturi |
| 90° | 9.3 | 4.8 |
| 45° | 5.3 | 1.9 |
| 30° | 1.5 | 0.4 |

To illustrate ΔP in psi with different size venturi throats, in a plant size carbon black reactor,

| | Diameter Venturi Throat | |
|---|---|---|
| Angle (A) | 8 in. (20.3 cm.) | 7 in. (17.8 cm.) |
| 90° | 4 | 5 |
| 65° | 2.5 | 3.5 |

When an 8 inch diameter throat venturi is operated for an extended period, deposits cause it to become equivalent to a 7 inch diameter throat. Operation is started with the 8 inch throat venturi at an angle A of 90°. As the 8 inch throat decreases in size with continued operation, and ΔP increases across the reactor, the angle A is changed to 65°, for example.

| Reactor Unit | Typical Run (Estimated) | |
|---|---|---|
| Precombustion Zone: | | |
| Diameter, inches, | 39 | (99.06 cm) |
| Length, inches, | 12 | (30.48 cm) |
| Reactor: | | |
| Diameter, inches, | 15 | (38.10 cm) |
| Venturi(a) (20° × 8°) | | |
| Total Length, inches, | 67.5 | (171.45 cm) |
| Converging Zone, length, inches, | 42.5 | (107.95 cm) |
| Diverging Zone, length, inches, | 25 | (63.50 cm) |
| Throat Diameter, inches, | 8 | (20.32 cm) |
| Quench Locus, inches, | 110 | (279.4 cm) |
| Operation: (Tangential Inlets at 90°) | | |
| Tangential Air, SCF/hr., | 221,000 | (6262 m³/hr) |
| Tangential Fuel (CH₄), SCF/hr., | 15,000 | (425 m³/hr) |
| Axial Air, SCF/hr., | 4,000 | (113.3 m³/hr) |
| Make Oil (Aromatic), gal/hr., | 300 | (1135.5 |
| BMCI | 120 | liter/hr) |
| Mid-Boiling Point, °F. | 700 | (371° C.) |
| Total Air/Oil, SCF/gal, | 750 | (5.62 m³/liter) |
| Original ΔP, psi, Precombustion Zone to Quench | 4 | (27.6 kPa) |
| Final ΔP, psi, Precombustion Zone to Quench(1) | 5 | (34.5 kPa) |
| Operation: (Tangential Inlet at 65°) | | |
| Tangential Air, SCF/hr., | 221,000 | (6262 m³/hr) |
| Tangeitial Fuel (CH₄), SCF/hr., | 15,000 | (425 m³/hr) |
| Axial Air, SCF/hr., | 4000 | (113.3 m³/hr) |
| Make Oil (Aromatic), gal/hr., | 300 | (1135.5 liters/hr) |
| BMCI | 120 | |
| Mid-Boiling Point, °F. | 700 | (371° C.) |
| Total Air/Oil, SCF/gal, | 750 | (5.62 m³/liter) |
| New ΔP, psi, Precombustion Zone to Quench | 3.5 | (24.15 kPa) |
| It is estimated that the reactor will run about 120 days more until ΔP increases back to 5 psi after switching to the angularly disposed inlets | | |

| Average Carbon Black Properties: | 90° Operation | 65° Operation |
|---|---|---|
| N339 | | |
| (2)N₂SA, m²/gm., | 95 | 95 |
| (3)24M4 DBP, cc/100 gm., | 97 | 97 |
| (4)Photometer Value, | 90 | 90 |
| (5)Tinting Strength | 108 | 108 |
| Production, pounds/hr., | 1500 | 1500 |
| Production, kg/hr., | 682 | 682 |

(a)For the venturi the converging total angle is 40° and the diverging total angle is 16°.
(1)When ΔP increases to about 5 psi (34.5 kPa), the angle A is changed from an actual 90°, to the longitudinal axis, tangential to an actual 65°, to the longitudinal axis, tangential so that the tangential air can be maintained at the total maximum 225,000 SCF/hr. (6375 m²/hr.), and the maximum oil rate (for this black) of 300 gallons per hour (1135.5 liters/hr.), in order to be able to continue to make the same type of carbon black at the same origional production rate (same maximum weight quantitiy per hour). Invention allows a much longer run (additional 120 days) at the maximum carbon black production, of the same carbon black type;
(2)ASTM D-3037-76;
(3)ASTM D-3493-76;
(4)ASTM D-1618-75;
(5)ASTM D-3265-76.

It is to be understood that while I have illustrated and described certain forms of my invention, it is not to be limited to the specific form or arrangement of parts herein described and shown.

That which is claimed is:

1. A carbon black reactor comprising:
    a reaction section of generally circular transverse cross section;
    a combustion section positioned upstream of said reaction section and communicating therewith, said combustion section being of generally circular transverse cross section and longitudinally coaxial with said reaction section;
    means operable to introduce a feed material into said combustion section generally along the longitudinal axis thereof;
    at least one first conduit means communicating with said combustion section operable to introduce combustion gases thereinto, each said first conduit means being located so as to introduce the combustion gases in a direction generally tangential to the side wall of the combustion section in a plane generally perpendicular to the longitudinal axis of the combustion section; and at least one second conduit means communicating with said combustion section operable to introduce combustion gases thereinto, each said second conduit means being located so as to introduce the combustion gases in a direction generally tangential to the side wall of the combustion section in a plane which is at an angle of about 30° to 60° with respect to the longitudinal axis of the combustion section, said second conduit means opening in a direction toward the reaction section of the reactor.

2. A carbon black reactor comprising:

a reaction section of generally circular transverse cross section;

a combustion section positioned upstream of said reaction section and communicating therewith, said combustion section being of generally circular transverse cross section and longitudinally generally coaxial with said reaction section;

means operable to introduce a feed material into said combustion section generally along the longitudinal axis thereof;

at least one first conduit means communicating with said combustion section operable to introduce combustion gases thereinto, each said first conduit means being located so as to introduce the combustion gases in a direction generally tangential to the side wall of the combustion section in a plane generally perpendicular to the longitudinal axis of the combustion section; and at least one second conduit means communicating with said combustion section operable to introduce combustion gases thereinto, each said second conduit means being located so as to introduce the combustion gases in a direction generally tangential to the side wall of the combustion section in a plane which is at an angle of about 30° to 60° with respect to the longitudinal axis of the combustion section, said second conduit means opening in a direction toward the reaction section of the reactor;

a pressure sensing means associated with said reaction section and operable for measuring a pressure drop across a length of said reaction section; and a valve means operably connected to said pressure sensing means and operable for selectively changing flow of combustion gases from said first conduit means to said second conduit means.

3. A reactor in accordance with claim 2 wherein there are two first conduit means located in spaced relationship with one another and positoned to introduce the combustion gases in a common rotational direction, and wherein there are two second conduit means located in spaced relationship with one another and positioned to introduce the combustion gases in a common rotational directon.

4. A reactor in accordance with claim 2 wherein said reaction section is provided with a venturi section.

5. A reactor in accordance with claim 2 wherein a truncated conical section is disposed between and coaxial with said combustion and reaction sections, the smaller diameter end of said truncated conical section being adjacent said reaction section.

* * * * *